March 6, 1956 J. H. GUYTON 2,737,581
SIGNAL SEEKING TUNING CIRCUIT
Filed March 27, 1952
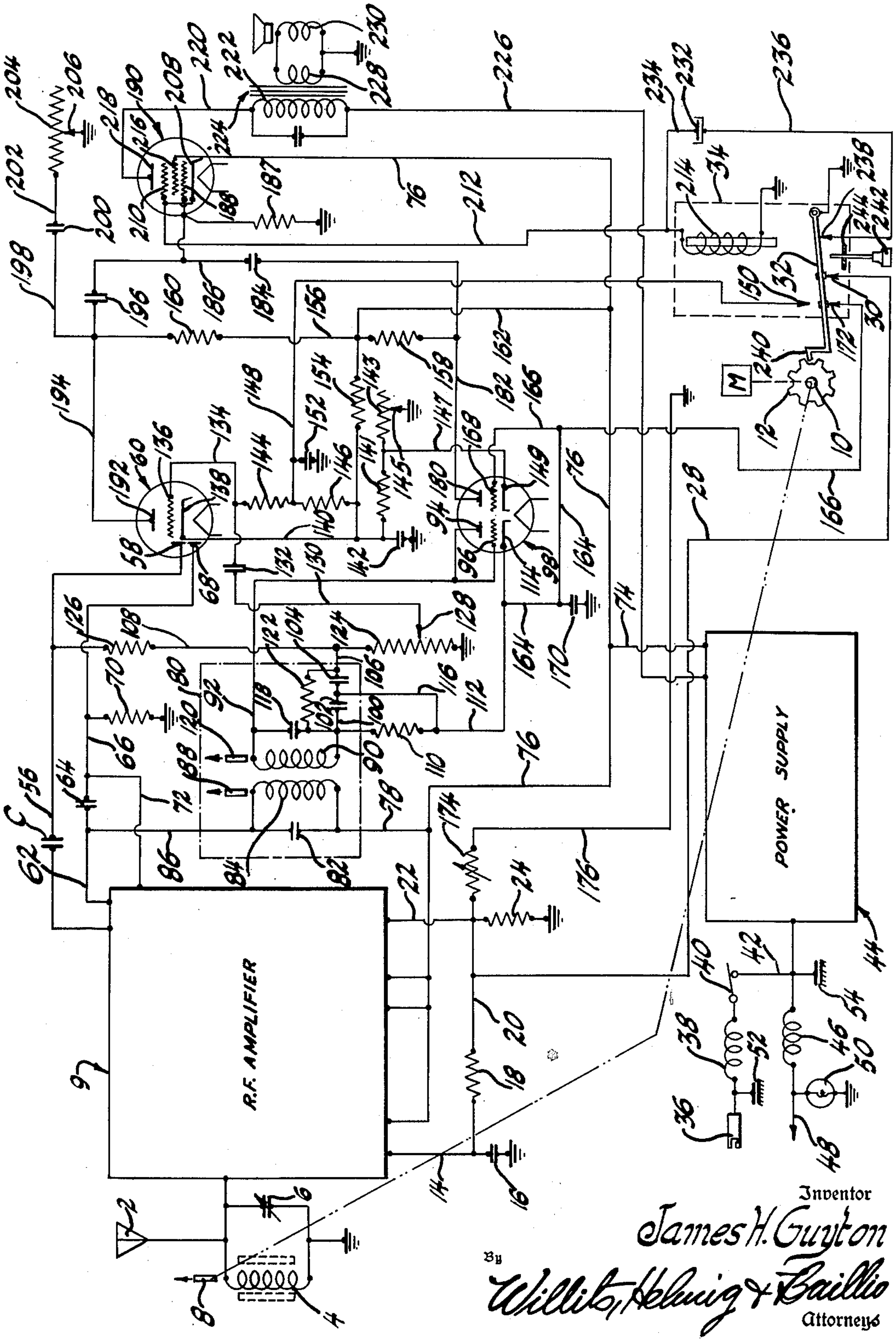
Inventor
James H. Guyton
By Willits, Helwig & Baillio
Attorneys 2,737,581

SIGNAL SEEKING TUNING CIRCUIT

James H. Guyton, Kokomo, Ind., assignor to General Motors Corporation, Detroit, Mich., a corporation of Delaware Application March 27, 1952, Serial No. 278,936

15 Claims. (Cl. 250—20)

This invention relates to indexing means and more particularly means for indexing radio receiving apparatus to receive transmitted signals. Various automatic means have been developed for indexing the tuning means of radio receivers to receive desired stations, such, for example, as mechanical push button tuners, motor-driven tuners and so-called "signal actuated" tuners in which the reception of a transmitted signal of sufficient strength actuates trigger means to stop the tuning means. Copending application Serial No. 193,148, in the names of Bertram A. Schwarz and Manfred G. Wright, filed October 31, 1950, which issued as Patent No. 2,701,330, February 1, 1955, discloses such a signal actuated tuner.

These signal actuated tuners are relatively complex mechanisms and involve complex circuits and it it one of my objects in making this invention to provide a signal actuated tuning means that does not require as many elements as that previously disclosed, is simpler, and less expensive.

It is a further object in my invention to provide an automatic tuning means actuated by incoming signals, using a minimum number of control tubes.

It is a still further object in my invention to provide a signal actuated tuning means which utilizes the audio power amplifying tube as an energizing means for the control relay.

It is a still further object in my invention to provide a manually actuated relay armature for control purposes.

With these and other objects in view which will become apparent as the specification proceeds, my invention will be best understood by reference to the following specification and claims and the accompanying drawing, in which the figure is a circuit diagram of a radio receiving means controlled by an automatic tuning means embodying my invention.

Referring now more specifically to the drawing there is shown thereon an antenna 2 connected to the radio frequency resonant circuit formed of a tuning inductance 4 and an adjustable condenser 6, the latter being connected to the radio frequency amplification means 9 diagrammatically illustrated by the block labeled "RF amplifier" and incorporating the radio frequency converter and intermediate frequency amplifiers. The inductance 4 is varied for tuning purposes by the movement of the core 8 with respect to the coil. The means for driving said core and the remaining cores for the other tuned circuits in the amplifier may be any desired motive power indicated diagrammatically at M which simultaneously rotates shaft 10, carrying a governor indexing wheel 12. The driving connection between the tuning means and the shaft 10 is indicated by the dotted line.

Line 14 is connected to the cathode of the RF amplifier tube and to ground through condenser 16. It is also connected to one terminal of a resistor 18, the opposite terminal of which is connected to line 20. Conductive line 22 interconnects line 20 with the cathode circuit of the IF amplifier tube. A resistor 24 of high ohmic value is connected between line 20 and ground. Line 20 is also directly connected to line 28 which extends to a stationary contact 30, engageable by movable armature 32 of the relay 34.

A power source, such for example as a storage battery, not shown, is connectable to member 36, which is half of a spring biased coupling. This member is connected through a coil 38 to a manual off and on switch 40. The switch 40 in turn is connected to line 42 which extends to a vibrator power supply unit 44 labeled "power supply." Line 42 is also connected to a coil 46, the opposite terminal of which is connected to low voltage power supply line 48 for such circuits as the tube heater circuits which have not been specifically shown in order to simplify the drawing. An indicating lamp 50 is connected between line 48 and ground to advise the operator when the receiver is energized by the closing of switch 40. Input connector 36 is connected to ground through condenser 52 and line 42 is also connected to ground through condenser 54.

The output of the IF amplifier of the RF amplifier block is fed to line 56, through a condenser C, which is connected directly to diode plate 58 of the duo-diode-triode tube 60. The output is also connected to line 62 and thence to condenser 64, the opposite side of which is connected to line 66 which extends to the diode plate 68 of the tube 60. A resistor 70 is connected between line 66 and ground. A feedback line 72 is connected to line 66 and is adapted to apply the voltage developed across resistor 70 by the rectifying action of the diode 68 back to the control elements of the amplifiers for automatic volume control action. A supply line 74 from the power supply system is connected to interconnecting line 76 which extends to the various tube elements such as plates through appropriate impedances. A further line 78 connects one side of the intermediate frequency transformer indicated generally at 80 with the power supply line 76, said intermediate frequency transformer including a capacitance 82 and an inductance 84, the latter forming the transformer primary, and connected by line 86 with the plate circuit 62. The condenser-inductance circuit may be permanently tuned to the desired IF frequency by a factory-adjusted movement of the core 88, which is mounted adjacent thereto.

The secondary 90 of the intermediate frequency transformer has one terminal connected to line 92, which extends to both the plate 94 and control grid 96 of the double triode tube 98. Thus the two elements both act as plates. The opposite side of the secondary 90 is connected to line 100 which extends to a condenser 102, the opposite side of which is connected to a second condenser 104, and in turn the opposite side of the latter is connected through line 106 to a tie line 108. Line 100 is also connected to one terminal of a resistor 110, the opposite terminal of which is connected to line 112, extending directly to cathode 114 of the first section of the double triode tube 98. A conductive line 116 is connected from a point intermediate the two condensers 102 and 104 to line 112. A condenser 118 is connected directly across the secondary 90 and forms the resonant circuit for the secondary therewith which can be adjusted by adjusting the position of the core 120. A resistor 122 is connected between line 106 and line 100 or in shunt across the two condensers 102 and 104.

Line 108 extends between one terminal of a potentiometer resistance 124 and one terminal of resistor 126, the opposite terminal of the resistance 126 being directly connected to line 56 and the opposite terminal of resistor 124 being connected to ground. A variable tap 128, capable of movement over the surface of resistor 124 to provide different values of resistance for the circuit, is connected to line 130 which extends to one side of a condenser 132, the opposite side of which is connected through line 134 to control grid 136 of the triode section of the tube 60. This is the volume control means for the receiver and by moving tap 128 the sound may be made louder or softer. The cathode 138 of the tube 60 is connected through line 140 to one side of a condenser 142, the opposite terminal of which is grounded. Line 140 is also connected to one terminal of resistor 141 which is connected in series with a resistance 143, the latter having a variable tap 145 which is connected to ground. At the junction of the resistors 141 and 143, a line 147 is connected which extends to the cathode 149 of the second triode section of the tube 98. Two biasing resistors 144 and 146 are connected in series between lines 134 and 140. A tap line 148 is connected to the intermediate point between resistances 144 and 146 and extends directly to a stationary contact 150 of the relay 34, which is engaged by the armature when the relay coil is energized. A condenser 152 is connected between line 148 and ground.

Resistor 154 has one terminal connected to line 140 and the opposite terminal connected to tie line 156 extending between resistors 158 and 160. It also is connected through tie line 162 to the power supply line 76. Conductive line 164 extends between line 112 and line 166 connected to grid 168, thereby interconnecting cathode 114 of the first triode section of the tube 98 and control grid 168 of the second section. Conductive line 164 is connected to ground through condenser 170. The opposite end of line 166 from that connected to control grid 168 is connected to stationary contact 172 of the relay 34. Line 20 is directly connected to one side of a variable resistor 174, the opposite terminal of which is connected through line 176 to ground. This is the portion of the circuit which determines the sensitivity of the receiver and, as will be noted from the disclosure, the sensitivity of said receiver is switched from one value during signal seeking or tuning to another value during listening periods by movement of the armature of the relay away from or contacting with contact 30 to alternately shunt out variable resistance 174.

Plate 180 of the second triode section of the tube 98 is connected by line 182 to one side of a condenser 184, the opposite side of said condenser being connected to line 186 which extends directly to control grid 188 of a power amplifier tube 190. This grid 188 ground return is by a resistor 187 between said grid and ground. In like manner plate 192 of the triode section of the tube 60 is connected through line 194 to a condenser 196 and through that to line 186 to the same control grid. Thus both the plate 180 of tube 98 and plate 192 of tube 60 are A. C. coupled to the control grid 188 of the power amplifier tube 190. The size of the coupling condensers 196 and 184 are such as to provide an audio frequency coupling from plate 192 and a low frequency coupling from plate 180 in the control pulse frequency range. Line 194 is connected to a tie line 198 which extends to one terminal of a condenser 200, the other terminal being connected through line 202 to one terminal of a resistance 204 which is provided with a variably positionable tap 206 which is grounded. This is to provide tone control for the receiver.

The cathode 208 of the power amplifier 190 is connected to a grid 210 and both are connected through line 212 to the operating coil 214 of relay 34, the opposite side of which is grounded. A third grid 216 of the power amplifier tube 190 is directly connected to power supply line 76. The plate 218 of the amplifier tube 190 is connected through line 220 with one terminal of the primary 222 of an audio frequency transformer 224. The other terminal of the primary winding 222 is connected through line 226 to the power supply 44. The secondary 228 of the audio transformer is connected to a loud speaker operating coil 230. Condenser 232 has one terminal connected to line 212 through line 234 and the other terminal connected through line 236 to stationary contact 238 of the relay 34. It will thus be seen that when the armature is in the deenergized position such as that shown, that the condenser is directly connected in shunt with the coil 214, but when the relay is energized and the armature moved to its upper position, the condenser will be removed from the circuit. When the tip 240 of the armature is in its lower or deenergized position, this tip engages the teeth of the wheel 12 and mechanically restrains it from any rotative movement. However, when the relay is energized and the armature raised to its upper position, tip 240 moves out of the path of the teeth and the gear and other mechanical means connected thereto including the tuning means may move, which, of course, moves the tuning means to tune the receiver over the band. It is to be noted that the operating coil 214 of the relay is in the cathode circuit of the tube 190. This portion of the system is so designed that there will never be sufficient current passing through the relay coil 214 to attract its armature 32 from the deenergized position, as shown. However, once the armature has been moved, and in this case it is moved mechanically to its operated position, then there is sufficient magnetic attraction to retain it in that position. This, therefore, might be termed a manually mechanically initiated tuning means. For this purpose there has been diagrammatically shown a manually engageable plunger 242 which is shown as projecting through a plate 244 of the receiver and when forced inwardly would move the armature 32 to the energized position, permitting the tuning means to operate. The coil 214 is designed to have just the proper amount of resistance to bias the cathode when the tube 190 is operating as an ordinary power audio amplifier.

The diode 58–138 of the tube 60 is one of the detector diodes. Diode 68–138 provides the AVC or automatic volume control voltage for the radio frequency amplifier, and the first triode section of the tube 98 is connected as a diode since the plate and grid are connected together and this forms a second detector diode which with diode 58–138 develops a positive control pulse on line 164. The details of this portion of the system, in which two opposed voltages are used to develop a positive control pulse, are the subject matter of a copending application, and therefore will not be discussed here in detail, but reference should be made to copending application Serial No. 106,223, James H. Guyton, filed July 22, 1949, entitled "Signal Seeking Tuner," which issued as Patent No. 2,652,486 on September 15, 1953. The triode portion of the tube 60 is the first-stage audio amplifier and obtains its detected signal from the voltage developed on the volume control 124. The second triode section of the tube 98 on the other hand acts as an amplifier for the trigger voltage, the output of both of these triode sections being A. C. coupled through condensers 196 and 184 respectively to the control grid 188 of the power amplifier 190. By moving tap 145 across resistor 143, the bias on the second triode section of the tube 98 may be changed to vary the strength of this amplifier and thus adjust the triggering means to index either on strong signals only or on weaker stations.

In the operation of this device, therefore, the main switch 40 is, of course, closed to energize the set and, assuming that it is in tune on station, the relay armature will be in the position shown and the listening sensitivity of the radio frequency amplifier will be determined by resistor 18, since variable resistor 174 is effectively bypassed through line 28 to ground through the armature. Also in this position, the control grid 168 of the amplifying triode section of tube 98 is grounded through contact 172 of the relay armature. Thus no triggering pulse can be applied to the audio frequency power amplifier. Condenser 232 is effectively connected in shunt with the operating coil 214 of the relay 34, the circuit from biasing resistors 144 and 146 is open at contact 150, and mechanical detent 240 is in engagement with the teeth of the gear 12 to prevent any rotation thereof or associated movement of the tuning means. The set is, therefore, operating normally, the signal being detected by detector 58–138 and applied to the first-stage audio amplifier on grid 136 of the triode 138–136–192 and thence A. C. coupled to the grid 188 of the power amplifier 190 from which the amplified signal is applied to the loud speaker. No current flow through tube 190 will be sufficient to cause armature 32 to be attracted by its coil 214 so that the tuning means may be driven. The conductive circuit for the relay coil 214, including tube 190, is from power line 226 through transformer 222, line 220, plate 218, the electron stream of the tube, cathode 208, line 212, and coil 214 to ground.

If now it is desired by the operator to tune to another station, he forces inwardly the button 242, mechanically moving the armature toward the relay and at the same time breaking contact with contacts 172, 30, and 238, and making a grounding contact with stationary contact 150. Coil 214 has sufficient strength to maintain the armature 32 in that position. The tuning means will then move away from the frequency of the station which has just been received and can operate, turning shaft 10 and gear 12, and at the same time moving the tuning means such as core 8 with respect to its coil. During tuning the sensitivity of the receiver is determined by resistor 18 and variable resistor 174 in series as they are now both included in the cathode circuit of the amplifier. Breaking of the contact between armature 32 and contact 172 removes the ground from the control grid 168 of the amplifying section of the trigger tube so that that may now operate, and breaking of the contact between armature 32 and contact 238 removes the condenser 232 from the circuit, leaving only coil 214.

When a station, therefore, is encountered as the frequency band is scanned, a positive pulse will be generated on line 164, driving grid 168 positive and causing current flow through this triode section of the tube 98. This will reduce the voltage on grid 188 and tend to drive it negative, and at a given value will cause the power amplifier conduction to be reduced to such a point that current flow through coil 214 will be so low that its magnetic strength will be incapable of maintaining the armature 32 in its raised position, and it will, therefore, fall back to the position shown, stopping the tuning means and completing the circuits just mentioned.

It will thus be seen that I have provided an automatic tuning means of a signal actuated type in which only one additional tube has been used since the power amplifier tube has been utilized for a dual role and one in which the operation of the solenoid armature has been much simplified in that it is moved into position mechanically and dropped back by a reduction of current flow in the power amplifier.

I claim:

1. In indexing means for radio receiving apparatus, having a radio frequency amplifying section, a detector section and a multistage audio frequency amplifying section, rectifying means in said detector section, conductive means upon which a voltage is developed upon the appearance of an incoming signal in the receiver connected to the rectifying means, independent electronic trigger means connected to said conductive means and to the last stage of the audio frequency amplifier to change the conductivity of the latter upon the receipt of a signal, tuning means for tuning the receiver over a band of frequencies, driving means for the tuning means, indexing means for the driving means including a coil and conductive means connecting said coil with the last stage of the audio frequency amplifier to be energized by the flow of current through said amplifier stage and control the indexing of the driving means.

2. In radio receiving means having tuning means for tuning the same over a frequency band and a multistage audio frequency amplifying means, driving means for the tuning means, means for controlling the driving means including a coil, conductive means upon which a control voltage is developed upon the appearance of a signal in the receiver, and electronic trigger means connected to the conductive means and to the last stage of the audio frequency amplifier to vary the conductivity of the latter, said coil being connected in the circuit of the last stage of the audio amplifier and its energization for control being determined by conductivity of said audio amplifier, a condenser connected in shunt to the coil, and switching means in said shunt circuit actuated by said means for controlling said drive means to deenergize the condenser during tuning.

3. In radio receiving means having power actuated tuning means and signal amplification means, indexing relay means including an armature movable into physical engagement with a part of the power actuated means to stop the same when the armature is in its position of rest and a coil, conductive means connecting said coil to the amplification means to provide energization therefor only through said amplification means, said amplification means being so adjusted as to limit the energy to the coil to a value insufficient to cause the coil to attract its armature from a position of rest at any time but of sufficient strength to hold the same if it is moved to its energized position.

4. In radio receiving means having power actuated tuning means and a signal amplification means, indexing relay means including an armature movable into physical engagement with a part of the power actuated tuning means to stop the same when the armature is in its position of rest and a coil, conductive means connecting said coil to the amplification means to provide energization therefor only through said amplification means, said amplification means being so adjusted as to limit the energy to the coil to a value insufficient to cause the coil to attract its armature from a position of rest at any time but sufficient to hold the same if it is moved to its energized position, conductive means in the receiving means upon which a voltage is developed upon receipt of an incoming signal and electronic trigger means connected to the last-named conductive means and to the amplification means to vary the conductivity thereof with varying voltage on the conductive means to control the relay indexing means.

5. In radio receiving means having radio frequency amplifying means, audio frequency amplifying means, detector means and driving means for tuning the receiving means over a frequency band, conductive means upon which a signal is developed upon the appearance of a transmitted signal in the receiving means connected to the detector, relay indexing means including an armature and a coil connected to the audio amplifying means said coil being energized only by current flow through said audio amplifying means, said relay armature being engageable with said driving means to lock the same against movement when the relay is in one position, manual means for moving said armature out of engagement with the driving means and to a position adjacent the coil, said conductive means being connected to the audio amplifier to control the conductance therethrough, dependent upon the variation in signal thereon and thus control the relay indexing means.

6. In radio receiving means having tuning means for tuning the same over a frequency band, and a multistage audio frequency amplifying means, driving means for the tuning means, relay means for controlling the driving means including a coil, conductive means upon which a control voltage is developed upon the appearance of a signal in the receiver, independent electronic trigger means connected to the conductive means and to the last stage of the audio frequency amplifier to vary the conductivity of the latter, said relay coil being connected in the circuit of the last stage of the audio amplifier and its energization for control being determined only by conductivity of said last stage, and adjustable means connected to the electronic trigger means to change the bias thereon to vary the output to determine the strength of the incoming signal that will actuate the relay means for indexing.

7. In radio receiving means having power actuated tuning means, radio frequency and audio frequency amplifying means and detector means, conductive means connected to the detector means upon which a voltage is developed upon the appearance of an incoming signal, independent electronic means having a cathode, grid and anode connected to said conductive means and to the audio frequency amplifier means to vary the conductance of the latter with voltage variations on the conductive means, indexing relay means controlling the power actuated tuning means connected to the audio frequency amplifier means and controlled by the conductance thereof, and adjustable means connected to the cathode of the electronic trigger means to adjust the bias to vary the output thereof to determine the strength of the incoming signal that will actuate the relay means for indexing.

8. In radio receiving means having power actuated tuning means and signal amplification means, indexing relay means including an armature movable into physical engagement with a part of the power actuated tuning means to stop the same when the armature is in its position of rest and a coil, conductive means connecting said coil to the amplification means to provide energization therefor, said amplification means being so adjusted as to limit the energy to the coil at all times to a value insufficient to cause the coil to attract its armature from a position of rest but sufficient to hold the same if it is moved to its energized position, and manually engageable means for moving the armature from a position of rest to a position adjacent the coil so that the latter may hold it.

9. In radio receiving means having radio and audio frequency amplifying means and detector means, power actuated tuning means for tuning the receiver over a frequency band, conductive means connected to the detector upon which a voltage is developed upon the receipt of an incoming signal, independent electronic triggering means biased to be non-conductive in the absence of a received signal connected to the conductive means and caused to conduct when a signal of sufficient amplitude is received to provide a voltage on the conductive means, adjustable biasing means connected to the electronic triggering means so that its output can be varied, said output being connected to the audio frequency amplifying means to change the conductivity thereof as the voltage on the conductive means varies with the strength of the incoming signals.

10. In radio receiving means having radio and audio frequency amplifying means and detector means, power actuated tuning means for tuning the receiver over a frequency band, conductive means connected to the detector upon which a voltage is developed upon the receipt of an incoming signal, electronic triggering means biased to be nonconductive in the absence of a received signal connected to the conductive means and caused to conduct when a signal of sufficient amplitude is received to provide a voltage on the conductive means, adjustable biasing means connected to the electronic triggering means so that its output can be varied, said output being connected to the audio frequency amplifying means to change the conductivity thereof as the voltage on the conductive means varies with the strength of the incoming signals, and relay indexing means for indexing the power actuated tuning means having a coil and an armature, the latter engaging the tuning means to index the same, said coil being connected in the conductive circuit of the audio frequency amplifying means and energized by the flow of current therethrough.

11. In radio receiving means having radio and audio frequency amplifying means and detector means, power actuated tuning means for tuning the receiver over a frequency band, conductive means connected to the detector upon which a voltage is developed upon the receipt of an incoming signal, electronic triggering means biased to be non-conductive in the absence of a received signal connected to the conductive means and caused to conduct when a signal of sufficient amplitude is received to provide a voltage on the conductive means, adjustable means for the biasing means connected to the electronic triggering means so that its output can be varied, said output being connected to the audio frequency amplifying means to change the conductivity thereof as the voltage on the conductive mean varies with the strength of the incoming signals, and relay indexing means for indexing the power actuated tuning means having a coil and an armature, the latter engaging the tuning means to index the same, said coil being connected in the conductive circuit of the audio frequency amplifying means and energized by the flow of current therethrough, the physical spacing of the armature from the coil and the conductive flow through the coil being so limited that the armature cannot be attracted from its position of rest but may be held in its attracted position once it has been moved thereto when no signal is developed on the conductive means, and manually engageable means to move the armature to its energized position.

12. In radio receiving means having radio and audio frequency amplifying means and detector means, power actuated tuning means for tuning the receiver over a predetermined frequency band, conductive means connected to the detector upon which a positive voltage is developed upon receipt of an incoming signal, an electron tube having a plate, grid and cathode, said grid being connected to said conductive means, biasing means for the tube to maintain the same nonconductive in the absence of a received signal including adjustable means connected to the cathode, a second tube included in the audio frequency amplifying means and having a plate, grid and cathode, coupling means between the plate of the first tube and the grid of the second, indexing means for the power actuated tuning means including a coil and a movable armature, the latter being engageable with the power actuated tuning means to stop the same, said coil being connected in the cathode circuit of the second tube and energized by current flow through said tube, and an electrical power source connected to the plate of the second tube.

13. In radio receiving means having radio and audio frequency amplifying means and detector means, power actuated tuning means for tuning the receiver over a predetermined frequency band, conductive means connected to the detector upon which a positive voltage is developed upon receipt of an incoming signal, an electron tube having a plate, grid and cathode, said grid being connected to said conductive means, biasing means for the tube to maintain the same nonconductive in the absence of a received signal including adjustable means connected to the cathode, a second tube included in the audio frequency amplifying means and having a plate, grid and cathode, coupling means between the plate of the first tube and the grid of the second, indexing means for the power actuated tuning means including a coil and a movable armature, the latter being engageable with the power actuated tuning means to stop the same, said coil being connected in the cathode circuit of the second tube and energized by current flow through said tube, an electrical power source connected to the plate of the second tube and grounding switching means connected to the grid of the first tube and actuated by the armature to prevent conduction through said first tube when the armature is in one position.

14. In radio receiving means having radio and audio frequency amplifying means and detector means, power actuated tuning means for tuning the receiver over a predetermined frequency band, conductive means connected to the detector upon which a positive voltage is developed upon receipt of an incoming signal, an electron tube having a plate, grid and cathode, said grid being connected to said conductive means, biasing means for the tube to maintain the same nonconductive in the absence of a received signal including adjustable means connected to the cathode, a second tube included in the audio frequency amplifying means and having a plate, grid and cathode, coupling means between the plate of the first tube and the grid of the second, indexing means for the power actuated tuning means including a coil and a movable armature, the latter being engageable with the power actuated tuning means to stop the same, said coil being connected in the cathode circuit of the second tube and energized by current flow through said tube, an electrical power source connected to the plate of the second tube, grounding switching means connected to the grid of the first tube, actuated by the armature to prevent conduction through said first tube when the armature is in one position, and further means for changing the sensitivity of the receiver between tuning and indexing conditions including second switching means actuated by the armature.

15. In radio receiving means having radio and audio frequency amplifying means and detector means, power actuated tuning means for tuning the receiver over a predetermined frequency band, conductive means connected to the detector upon which a positive voltage is developed upon receipt of an incoming signal, an electron tube having a plate, grid and cathode, said grid being connected to said conductive means, biasing means for the tube to maintain the same nonconductive in the absence of a received signal including adjustable means connected to the cathode, a second tube included in the audio frequency amplifying means and having a plate, grid and cathode, coupling means between the plate of the first tube and the grid of the second, indexing means for the power actuated tuning means including a coil and a movable armature, the latter being engageable with the power actuated tuning means to stop the same, said coil being connected in the cathode circuit of the second tube and energized by current flow through said tube, an electrical power source connected to the plate of the second tube, grounding switching means connected to the grid of the first tube, actuated by the armature to prevent conduction through said first tube when the armature is in one position, further means for changing the sensitivity of the receiver between tuning and indexing conditions including second switching means actuated by the armature, and a manual means for moving the armature out of engagement with the power actuated tuning means.

References Cited in the file of this patent

UNITED STATES PATENTS

| | | |
|---|---|---|
| 2,063,295 | Braden | Dec. 8, 1936 |
| 2,098,331 | Bowman | Nov. 9, 1937 |
| 2,499,573 | Dunn | Mar. 7, 1950 |
| 2,516,856 | Cowles | Aug. 1, 1950 |
| 2,541,017 | Alexander | Feb. 13, 1951 |
| 2,639,372 | Colgan | May 19, 1953 |
| 2,639,374 | Goodrich, Jr. | May 19, 1953 |